United States Patent
Mori et al.

(10) Patent No.: US 10,256,494 B2
(45) Date of Patent: Apr. 9, 2019

(54) ELECTROLYTE MEMBRANE FOR SOLID POLYMER FUEL CELL, METHOD FOR MANUFACTURING SAME, AND SOLID POLYMER FUEL CELL

(75) Inventors: Masahiro Mori, Osaka (JP); Shinya Kikuzumi, Osaka (JP)

(73) Assignee: Panasonic Intellectual Property Management Co. Ltd., Osaka (JP)

( * ) Notice: Subject to any disclaimer, the term of this patent is extended or adjusted under 35 U.S.C. 154(b) by 225 days.

(21) Appl. No.: 14/123,778

(22) PCT Filed: Jul. 20, 2012

(86) PCT No.: PCT/JP2012/004634
§ 371 (c)(1),
(2), (4) Date: Dec. 4, 2013

(87) PCT Pub. No.: WO2013/021553
PCT Pub. Date: Feb. 14, 2013

(65) Prior Publication Data
US 2014/0120448 A1    May 1, 2014

(30) Foreign Application Priority Data

Aug. 9, 2011   (JP) .................... 2011-173510

(51) Int. Cl.
*H01M 8/02* (2016.01)
*H01M 8/10* (2016.01)
(Continued)

(52) U.S. Cl.
CPC ....... *H01M 8/1065* (2013.01); *H01M 8/1041* (2013.01); *H01M 8/1062* (2013.01);
(Continued)

(58) Field of Classification Search
CPC .................. H01M 8/0289–8/0295; H01M 8/1058–8/1065; H01M 2/14–2/18
See application file for complete search history.

(56) References Cited

U.S. PATENT DOCUMENTS 5,830,603 A * 11/1998 Oka .................. H01M 2/145
204/296
2003/0162076 A1* 8/2003 Kubota .............. H01M 4/94
429/514
(Continued)

FOREIGN PATENT DOCUMENTS

EP    1674508    6/2006
EP    2128919    2/2009
(Continued)

OTHER PUBLICATIONS

International Search Report of PCT Application No. PCT/JP2012/004634 dated Sep. 25, 2012.
(Continued)

*Primary Examiner* — Barbara L Gilliam
*Assistant Examiner* — Helen M McDermott
(74) *Attorney, Agent, or Firm* — Wenderoth, Lind & Ponack, L.L.P.

(57) ABSTRACT

A solid polymer fuel cell has a plurality of stacked single battery modules having an electrolyte membrane, electrode layers disposed on both surfaces of the electrolyte membrane, and a pair of separators provided with a gas flow paths disposed on the inside surface so as to sandwich the electrode layer. The electrolyte membrane is provided with electrolyte material and a nonwoven fabric which is embedded in the electrolyte material. The nonwoven fabric is provided with a plurality of fused parts that are provided in a linear shape or spotted on a part of the nonwoven fabric that is a part corresponding to of the solid polymer fuel cell.
(Continued)

Two or more nonwoven fibers are fused to each other, and the thickness thereof is thinner than the membrane thickness of the unwoven fabric.

4 Claims, 13 Drawing Sheets

(51) Int. Cl.
*H01M 8/24* (2016.01)
*H01M 8/1065* (2016.01)
*H01M 8/242* (2016.01)
*H01M 8/1067* (2016.01)
*H01M 8/1069* (2016.01)
*H01M 8/1041* (2016.01)
*H01M 8/1062* (2016.01)
*H01M 8/1018* (2016.01)

(52) U.S. Cl.
CPC ....... *H01M 8/1067* (2013.01); *H01M 8/1069* (2013.01); *H01M 8/24* (2013.01); *H01M 8/242* (2013.01); H01M 2008/1095 (2013.01); Y02P 70/56 (2015.11)

(56) References Cited

U.S. PATENT DOCUMENTS

| | | |
|---|---|---|
| 2006/0159973 A1 | 7/2006 | Kotera et al. |
| 2008/0138697 A1 | 6/2008 | Asada et al. |
| 2009/0214924 A1 | 8/2009 | Kotera et al. |
| 2009/0239123 A1 | 9/2009 | Kotera et al. |
| 2009/0258274 A1 | 10/2009 | Uensal et al. |
| 2009/0324929 A1 | 12/2009 | Yamakawa et al. |
| 2010/0009236 A1 | 1/2010 | Kotera et al. |
| 2013/0280642 A1* | 10/2013 | Gummalla ................. C08J 5/22 429/492 |

FOREIGN PATENT DOCUMENTS

| | | |
|---|---|---|
| JP | 2003-317748 | 11/2003 |
| JP | 2006-100267 | 4/2006 |
| JP | 2006-134654 | 5/2006 |
| JP | 2007-18995 | 1/2007 |
| JP | 2008-47453 | 2/2008 |
| JP | 2009-230986 | 10/2009 |
| JP | 2010-196228 | 9/2010 |
| WO | 2008/072673 | 6/2008 |

OTHER PUBLICATIONS

The Extended European Search Report dated Mar. 31, 2014 for the related European Patent Application No. EP12821412.

* cited by examiner

ELECTROLYTE MEMBRANE FOR SOLID POLYMER FUEL CELL, METHOD FOR MANUFACTURING SAME, AND SOLID POLYMER FUEL CELL

TECHNICAL FIELD

The present invention relates to an electrolyte membrane for a polymer electrolyte fuel cell reinforced by a nonwoven fabric, a manufacturing method thereof, and a polymer electrolyte fuel cell.

BACKGROUND ART

A fuel cell is composed of modules stacked as many as necessary. Each of the modules is composed by joining an electrolyte membrane causing power generating reaction with catalyst layers, and providing separators interposing the joined material in between. In order to seal a fuel gas, the electrolyte membrane is fixed to a frame that is usually made of resin, by injection molding of a fixing seal referred to as a gasket preventing the fuel gas from leaking. The electrolyte membrane fixed to the frame is provided between the separators, and the assembly is referred to as a module.

In recent years, a proton conductive ion-exchange membrane has been used as the electrolyte membrane for a polymer electrolyte fuel cell. In particular, perfluorocarbon polymer (hereafter referred to as sulfonic perfluorocarbon polymer) is widely considered as its superior basic characteristics. One of the requirements for an actual electrolyte membrane used for a fuel cell is a low ohmic loss of the membrane. The ohmic loss of the membrane depends on the conductivity of an electrolyte polymer used for the membrane.

Methods for reducing the electric resistance of a positive ion exchange film include increasing the concentration of sulfonate acid group and reducing the thickness of the membrane. However, a significant increase in the concentration of sulfonic acid group reduces a mechanical strength of the membrane and results in a creep in the membrane when operating the fuel cell for a long time, causing a problem of reduced durability of the fuel cell, for example.

In addition, an electrolyte membrane having high concentration of sulfonic acid group significantly swells when absorbing moisture, and it tends to cause various disadvantages. For example, the dimensions of the membrane are likely to increase due to moisture generated at the time of power generation reaction, water vapor supplied with the fuel gas, and others. The increase in the dimension of the membrane contributes to forming "crinkles" in the membrane, and the "crinkles" fill grooves in separators, inhibiting flow of gas. Furthermore, by repeatedly stopping operation, the membrane swells and shrinks repeatedly. With this, the membrane or the electrodes fused to the membrane cracks, reducing the characteristics of the cell.

Providing a reinforcement layer in an electrolyte membrane has been proposed as a technique for solving the problem described above (see PTL 1 to 7).

As illustrated in FIG. 12, PTL 1 discloses a membrane-electrode assembly having solid-polymer electrolyte membrane 111 and porous sheet 113 provided as a reinforcement layer in electrolyte membrane 111. According to the configuration of membrane electrode assembly in PTL 1, porous sheet 113 is present at a center part in the thickness direction of electrolyte membrane 111, and reduces the change in dimension in the in-plane direction.

CITATION LIST

Patent Literature

PTL 1
Japanese Patent Application Laid-Open No. 2006-100267
PTL 2
Japanese Patent Application Laid-Open No. 2009-230986
PTL 3
Japanese Patent Application Laid-Open No. 2003-317748
PTL 4
Japanese Patent Application Laid-Open No. 2008-47453
PTL 5
United Stated Patent Application Publication No. 2009/0239123
PTL 6
United Stated Patent Application Publication No. 2009/0258274
PTL 7
United Stated Patent Application Publication No. 2008/0138697

However, in the configuration according to PTL 1, a region only with the electrolyte material (resin layer 125) is present on both surfaces of porous sheet 113. Accordingly, resin layer 125 is not restricted by porous sheet 113 in the thickness direction, and swells due to water generated when a fuel cell generates power or moisture used for humidifying the fuel gas. When electrolyte membrane 111 swells, electrode layers 127 and 128 are expanded outward, pressing gas diffusion layers 133 and 134 against separators 141 and 142.

Gas diffusion layers 133 and 134 pressed against separators 141 and 142 respectively enter grooves 145 and 146 formed in separators 141 and 142. By gas diffusion layers 133 and 134 entering grooves 145 and 146, the spaces of grooves 145 and 146 are reduced, interrupting flow of fuel gas. As a result, there is a problem that the pressure of fuel gas is lost, reducing the electrical generating property of the fuel cell.

FIG. 13 is a cross-sectional view illustrating an assembled cell module including a nonwoven fabric as a reinforcement layer in an electrolyte membrane. As illustrated in FIG. 13, when the nonwoven fabric is used as reinforcement layer 412, the nonwoven fabric having a three-dimensional structure can be included in the full thickness direction of electrolyte membrane 431.

FIG. 14 is a schematic view illustrating electrolyte membrane 431 swelling due to moisture. Electrolyte membrane 431 has nonwoven fabric as a reinforcement layer in a solid polymer electrolyte. As illustrated in FIG. 14, since nonwoven fabric 521 has a structure in which nonwoven fibers are piled in layers, no force for controlling electrolyte membrane 431 is exerted in the thickness direction. When electrolyte membrane 431 absorbs moisture, the thickness between layers of nonwoven fabric 521 increases and swelling of the entire membrane in the thickness direction cannot be prevented as a result. When the electrolyte membrane 431 is swollen, electrode layers 127 and 128 are expanded outward, pressing gas diffusion layers 133 and 134 against separators 141 and 142.

SUMMARY OF THE INVENTION

Gas diffusion layers 133 and 134 pressed against separators 141 and 142 respectively enter grooves 145 and 146 formed in separators 141 and 142. Since gas diffusion layers 133 and 134 enter grooves 145 and 146, the spaces in grooves 145 and 146 become narrower. Since the flow of fuel gas is interrupted, the pressure of the fuel gas is lost, resulting in reduced electrical generating property of the fuel cell.

PTL 2 and 5 disclose an electrolyte membrane for a polymer electrolyte fuel cell produced by hot roll pressing, having an ion-exchange resin as a main component reinforced by a nonwoven fabric made of fluorine resin with at least part of cross-points of its fibers fixed. PTL 3 discloses a solid electrolyte membrane formed by attaching glass electrolyte to a woven or nonwoven fabric having cross-points in its fibers fixed in a grid pattern, and stacking a fluorine-containing polymer films having a functional group on a front surface and a back surface of the woven or nonwoven fabric. PTL 6 and 7 suggest that a part of cross-points of fibers of an electrolyte membrane is fixed. While the stability in the dimensions of the electrolyte membrane would be achieved according to PTL 2, 3, and 5, none of PTL discloses a specific position of cross-points between fibers. Therefore, it is difficult to improve the accuracy in dimension of the electrolyte membrane especially when used for a fuel cell.

PTL 4 discloses a method for manufacturing a fuel cell including the following steps: (i) impregnating a strip-shaped base with an insulating material by a printing method so as to form island-shaped electrolyte regions equally-spaced in the longitudinal direction, surrounded by a layer impregnated with the insulating material at the outer circumference; (ii) forming electrolyte membranes by impregnating the electrolyte region with an electrolyte; and (iii) forming a conductor penetrating part in the insulating material impregnated layer between the electrolyte membranes. However, this method involves complicated steps, and it was difficult to improve the dimensional accuracy due to problems such as accuracy in printing.

The present invention has been conceived in order to solve the above problems. It is an object of the present invention to provide an electrolyte membrane for a polymer electrolyte fuel cell capable of reducing swelling not only in the in-plane direction but also in the thickness direction of the electrolyte membrane and maintaining the electrical generating property of the fuel cell, a manufacturing method thereof, and a polymer electrolyte fuel cell.

Another object of the present invention is to provide an electrolyte membrane for polymer electrolyte fuel cell capable of suppressing the swelling in the thickness direction of the electrolyte membrane when containing moisture, and preventing a gas diffusion layer base for a fuel cell (hereafter also referred to as "GDL") from entering a fuel gas flow path in a separator due to the swelling in the thickness direction, without reducing the proton conductivity.

Solution to Problem

According to a first aspect of the present invention, a polymer electrolyte fuel cell includes: a plurality of cell modules that are stacked, in which: each of the cell modules includes: an electrolyte membrane; a plurality of electrode layers provided on an upper surface and a lower surface of the electrolyte membrane; and a pair of separators interposing the electrode layers, each of the separators having an inner surface with a gas flow path, the electrolyte membrane includes an electrolyte material and a nonwoven fabric included in the electrolyte material, and wherein the nonwoven fabric includes a plurality of fused parts provided in straight lines or dots in a power generating region of the polymer electrolyte fuel cell, the fused parts each being formed of two or more strands of nonwoven fiber fused to each other and the fused parts having a thickness smaller than a thickness of the nonwoven fabric.

According to a second aspect of the present invention, an electrolyte membrane for a polymer electrolyte fuel cell, includes: an electrolyte membrane made of an electrolyte material; and a nonwoven fabric included in the electrolyte membrane, in which the nonwoven fabric includes a plurality of fused parts in which two or more strands of nonwoven fiber are fused to each other in straight lines or dots, the fused parts having a thickness smaller than a thickness of the nonwoven fabric.

According to a third aspect of the present invention, a method for manufacturing an electrolyte membrane for a polymer electrolyte fuel cell, includes: providing a nonwoven fabric; forming a plurality of fused parts having a thickness smaller than a thickness of the nonwoven fabric by fusing two or more strands of nonwoven fiber in straight lines or dots; and forming an electrolyte membrane by impregnating the nonwoven fabric having the fused part formed with an electrolyte material.

Advantageous Effects of Invention

According to the present invention, an electrolyte membrane for a polymer electrolyte fuel cell capable of reducing swelling not only in the in-plane direction but also in the thickness direction of the electrolyte membrane and maintaining the electrical generating property of the fuel cell, a manufacturing method thereof, and a polymer electrolyte fuel cell are provided. According to the present invention, since fibers in a part of the nonwoven fabric are fused, the electrolyte membrane is reinforced in the thickness direction, suppressing the swelling in the electrolyte membrane when the fuel cell is in operation, which secures high durability.

In addition, according to the electrolyte membrane for polymer electrolyte fuel cell according to the present invention, it is possible to prevent the swelling in the thickness direction when the electrolyte membrane contains moisture, without reducing the proton conductivity. In addition, it is possible to prevent GDL from entering the fuel gas flow path in the separators, caused by the swelling in the thickness direction.

DETAILED DESCRIPTION OF THE INVENTION

Figure 1:
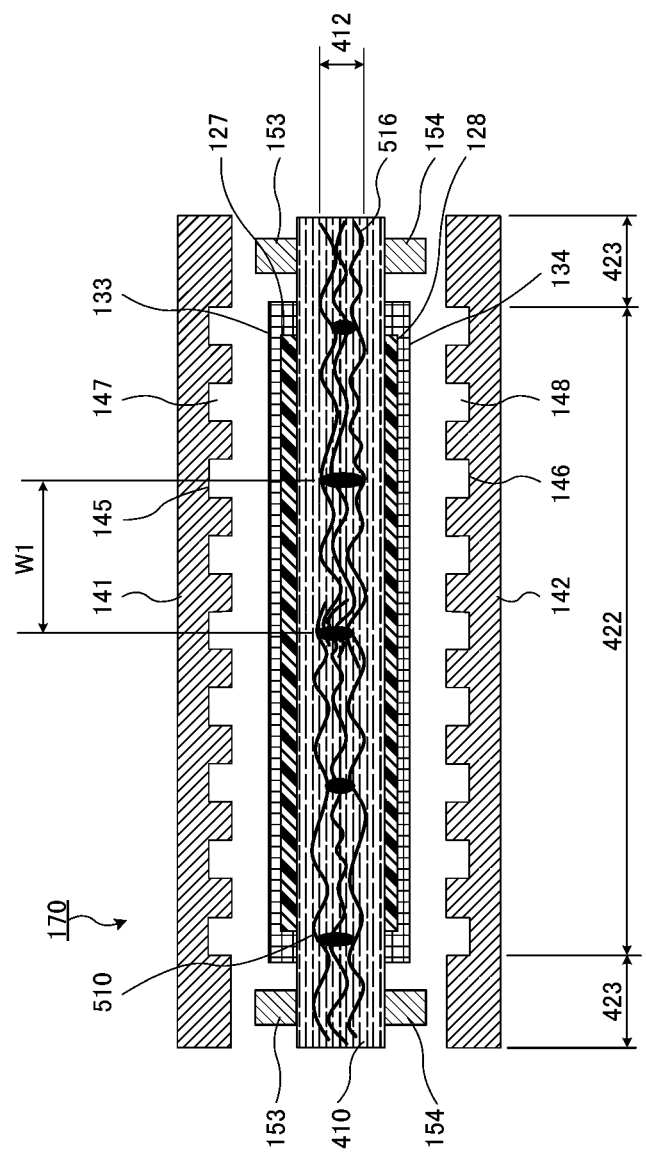
FIG. 1 is a cross-sectional view schematically illustrating an assembled cell module composing a polymer electrolyte fuel cell according to Embodiment 1.

The following describes the present invention with reference to Embodiments. However, the present invention is not limited to the following embodiments. Same or similar reference numerals may be assigned to the components having the same or similar functions in the diagrams, and description for these components is omitted. Note that the drawings are schematic. Accordingly, specific dimension and others are determined based on the following description. Needless to say, relationships between dimensions and ratios may be different among drawings.

<Polymer Electrolyte Fuel Cell>

(Embodiment 1)

FIG. 1 is a cross-sectional view schematically illustrating an assembled cell module composing a polymer electrolyte fuel cell according to Embodiment 1.

As illustrated in FIG. 1, cell module (cell) 170 composing a polymer electrolyte fuel cell according to Embodiment 1 includes electrolyte membrane 410, electrode layers 127 and 128 provided in power generating regions 422 on an upper surface and a lower surface of electrolyte membrane 410 respectively, and a pair of separators 141 and 142 provided so as to interpose electrode layers 127 and 128. Electrolyte membrane 410 includes an electrolyte material and nonwoven fabric 516 included in the electrolyte material as the reinforcement layer. Note that, as the electrolyte material, an ion-exchange resin that can fill interstices in a nonwoven fabric may be used. Separators 141 and 142 may include grooves 145 and 146 in parts corresponding to power generating region 422 inside in separators 141 and 142, and gas flow paths 147 and 148 in a space defined by the bottom surfaces and the side surfaces of grooves 145 and 146.

Cell module 170 further includes gas diffusion layer 133 between electrode layer 127 and separator 141, and gas diffusion layer 134 between electrode layer 128 and separator 142. Gaskets 153 and 154 are provided in membrane fixing part 423 at the ends of electrolyte membrane 410.

Figure 2:
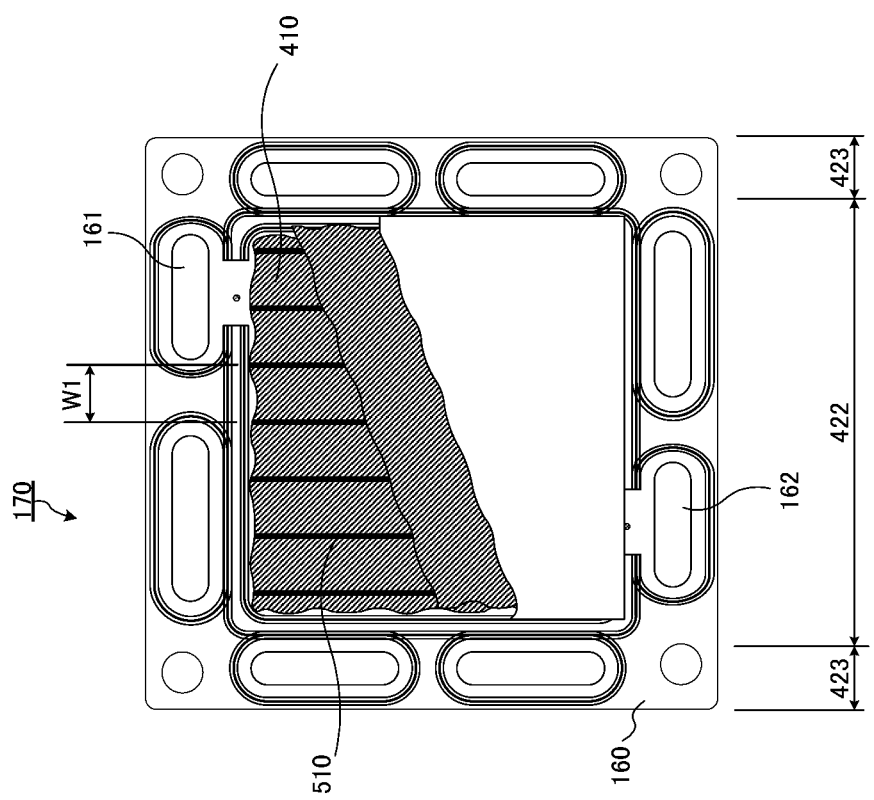
FIG. 2 is a partial cutaway top view of the cell module composing a polymer electrolyte fuel cell according to Embodiment 1.

FIG. 2 is a partial cutaway top view of cell module 170 composing the polymer electrolyte fuel cell according to Embodiment 1. As illustrated in FIG. 2, cell module 170 includes substantially square-shaped frame 160. Fuel gas inlet 161 is provided at the upper end of frame 160, and fuel gas outlet 162 is provided at the lower end of frame 160. Electrolyte membrane 410 is provided at a part of frame 160, corresponding to power generating region 422.

As illustrated in FIG. 2, nonwoven fabric 516 includes a plurality of fused parts 510. Each of fused parts 510 is provided in a straight line in power generating region 422 in cell module 170, includes two or more strands of nonwoven fiber fused, and has a thickness smaller than the thickness of nonwoven fabric 516. Fused part 510 is preferably provided at a part corresponding to power generating region 422 in cell module 170, particularly at a part corresponding to gas flow paths 147 and 148 in the separator, as illustrated in FIG. 1. This is because the electrical generating property of fuel cell may be maintained by reducing swelling not only in the in-plane direction, but also in the thickness direction of electrolyte membrane 410.

In Embodiment 1, straight fused parts 510 are provided parallel to sides of frame 160 in which fuel gas inlet 161 and fuel gas outlet 162 are not provided, that is, right end (left end). However, straight fused part 510 may be provided vertical to sides on which fuel gas inlet 161 and fuel gas outlet 162 of frame 160 are not provided, and may be provided diagonal to a side of frame 160.

Since it is necessary to bond two or more adjacent strands of fiber, fused part 510 is preferably wider than or equal to the width of adjacent fibers. Since nonwoven fabric 516 has a distribution of fibers of approximately 0.1 µm to 100 µm, it is preferable that the width of fused part 510 is 0.1 mm or more for fusing adjacent fibers. Note that, in Embodiment 1, the width of straight fused part 510 is approximately 1 mm.

At fused part 510 in nonwoven fabric 516, the interstices between strands of nonwoven fiber 516 are narrow or not present, which inhibits delivery of protons. If the distance between fused parts 510 is too small, the delivery of proton is inhibited, reducing the electrical generating property of the fuel cell. In contrast, if the distance between fused parts 510 is too large, the electrolyte material swells between fused parts 510, changing the thickness of the membrane. Accordingly, in terms of the electrical generating property and prevention of the swelling in the thickness direction, it is preferable to set the distance W1 between fused parts 510 in a range from 10 mm to 20 mm Note that, in Embodiment 1, the width of straight fused parts 510 W1 is 20 mm.

It is preferable to set the thickness or electrolyte membrane 410 in a range from 20 µm to 30 µm, and distance WI at fused part 510 as 20 mm. However, when the thickness of electrolyte membrane 410 is smaller than the range described above, the change in dimension with respect to thickness direction is small. Accordingly, the distance WI between straight fused parts 510 may be increased. Since the total area of fused part with respect to a power generating area is reduced, conduction or protons is improved. As a result, power generating efficiency of a fuel cell improves.

The fused region of nonwoven fabric 516 is preferably at least 0.5% and at most 10% of a total area corresponding to power generating region 422 in nonwoven fabric 516. If the area of the fused region is smaller than the lower limit value, it is difficult to maintain stability in the dimensions of the electrolyte membrane, and power generation efficiency is reduced if the area exceeds the upper limit value.

It is preferable that fused parts 510 are equally spaced, and it is more preferable that the distance between fused parts 510 is at least 10 mm and at most 20 mm. If the distance is smaller than the lower limit value, it is difficult to maintain stability in dimension of electrolyte membrane 410, and power generation efficiency is reduced if the distance exceeds the upper limit value.

It is preferable that fused parts 510 are formed in a grid pattern. When used as a fuel cell, the grid pattern stabilizes the dimension of electrolyte membrane 410 and is more likely to reduce stress exerted from outside.

When a nonwoven fabric made of nonwoven fiber having large tension strength is used, distance W1 between straight fused parts 510 may be increased. When distance W1 between straight fused parts 510 is large, the total area of the fused part with respect to the total area of the part corresponding to power generating region 422 becomes small. Accordingly, the influence on the proton conduction also becomes small, which is advantageous. The ratio of fused part 510 to the total area of the part corresponding to power generating region 422 is preferably 0.5 to 10%, based on the line width and distance W1 of the fused parts described above. Note that, the ratio of the part corresponding to power generating region 422 to the total area of fused parts 510 in embodiment 1 is approximately 5%.

The hardness of electrolyte membrane 410 at fused part 510 is different from a part that is not fused. Variation in hardness of electrolyte membrane 410 at membrane fixing part 423 causes variation in strength of fixing frame 160 and electrolyte membrane 410. Accordingly, in order to stabilize the strength of fixing frame 160 and electrolyte membrane 410, it is preferable that fused part 510 is only provided in power generating region 422, not in membrane fixing part 423.

As illustrated in FIG. 1, fused part 510 is formed at a part of nonwoven fabric 516, which is formed by stacking nonwoven fibers in layers. In this case, it is preferable to set the thickness of fused part 510 as thin as possible while maintaining thickness 412 of nonwoven fabric 516 indicated by arrow 412 at a predetermined thickness. In the cross section in the thickness direction of nonwoven fabric 516, it is preferable that nonwoven fabric 516 is in a shape connecting one main surface of the nonwoven fabric and the other main surface of the nonwoven fabric through fused part 510 as if the figures of number "8" are horizontally placed. This shape is for reducing the change in the dimension of electrolyte membrane 410 in the thickness direction. In addition, a propagation path for protons can be secured.

Furthermore, the thickness of the fused part 510 is not particularly limited as long as the change in the dimension of electrolyte membrane 410 is reduced and the propagation path for the protons is secured. More specifically, the thickness of nonwoven fabric 516 is preferably 5 to 65% of the thickness of the electrolyte membrane, and the thickness of fused part 510 is preferably 5 to 50% of the thickness of nonwoven fabric 516.

The fuel cell uses power generating reaction by propagation of protons. Accordingly, the higher a ratio of interstices of nonwoven fibers is, the higher the electrical generating property achieved becomes. Nonwoven fabric 516 manufactured by electrospinning has fiber having a small diameter, and thus the ratio of interstices per unit area of nonwoven fabric 516 can be increased. Accordingly, it is preferable to use nonwoven fabric 516 manufactured by electrospinning.

The temperature of electrolyte membrane 410 reaches approximately 80° C. when the fuel cell is in operation. Therefore, as a material for the nonwoven fabric 516, a material having sufficient heat-resistance and chemical stability in the temperature range is preferably used. As a specific material for nonwoven fabric 516, polyvinylidene difluoride (hereafter referred to as "PVDF") is preferably used considering its heat resistance and chemical stability, and that a nonwoven fiber can be formed by electrospinning. Instead of PVDF, polyvinylfluoride (hereafter referred to as "PVF") may be used. Alternatively, a copolymer consisting of PVDF and PVF as monomer units may be used. Alternatively, a mixture of PVDF and PVF may also be used. A hydrophobic material is preferable as a material for nonwoven fabric 516. By providing nonwoven fabric 516 made of a hydrophobic material inside electrolyte membrane 410, unnecessary moisture produced in electrolyte membrane 410 by power-generating reaction is drained, making it possible to reduce unnecessary swelling caused by the moisture.

In order to reduce the change in the dimension of electrolyte membrane 410 due to swelling and shrinking, electrolyte membrane 410 preferably has sufficient mechanical property, such as tension strength and an elongation. When the molecular weight is too low, a mechanical strength is reduced, and when the molecular weight is too high, solubility is reduced, making it difficult to form a solution. It is preferable that the molecular weight of PVDF is 150,000 to 550,000.

In order to form a nonwoven fiber of PVDF by the electrospinning, a solution obtained by dissolving PVDF in dimethylacetamide (hereafter referred to as DMAC) as a solvent is preferably used. Other solvents such as dimethyl sulfoxide, dimethyl formamide, and acetone may be used. Note that, when a polar solvent is used, PVDF is more likely to be melt.

A preferable concentration of solution is from 10% to 25%. The preferable concentration of the solution is defined as described above because when the concentration is lower than the lower limit, it is difficult achieve a sufficient diameter of fiber, making it difficult to prevent the change in the dimensions of electrolyte membrane 410 due to swelling and shrinking. Furthermore, if the concentration of the solution is higher than the upper limit, sufficient electrostatic burst cannot be obtained when forming nonwoven fibers by the electrospinning. As a result, the distance between the fibers is reduced, inhibiting proton propagation that is one of the functions of electrolyte membrane 410.

<Method for Manufacturing Polymer Electrolyte Fuel Cell>

A method for manufacturing an electrolyte membrane for a polymer electrolyte fuel cell will be described.

The method for manufacturing electrolyte membrane for an polymer electrolyte fuel cell includes: providing a nonwoven fabric; forming a plurality of fused parts having a thickness smaller than a thickness of the nonwoven fabric by fusing two or more strands of nonwoven fiber in straight lines or dots; and forming an electrolyte membrane by impregnating the nonwoven fabric having the fused part formed with an electrolyte material. In Embodiment 1, a method in which nonwoven fabric 516 manufactured by the electrospinning is fused by thermal compression fusing will be described step by step.

(i) Step for Providing Nonwoven Fabric

First, nonwoven fabric 516 is manufactured by the electrospinning. Here, the electrospinning refers to a method for manufacturing microfiber, and includes applying a high voltage between a polymer solution in a syringe and a collector electrode and pressing the solution out of the syringe, such that the solution that is pressed out of the syringe is charged, fine fibers are produced from the charged solution, and the fine fibers are adhered to the collector.

More specifically, an electrospinning apparatus is provided. A nonwoven fabric is manufactured by filling a syringe with PVDF solution containing PVDF dissolved in DMAC, and subsequently applying a voltage between the syringe and the collector electrode at approximately 20 kV and a pressure for injection at approximately 30 kPa.

(ii) Step for Forming Fused Part

Figure 3A:
FIGS. 3A to 3C are schematic views illustrating a method for creating fused parts of a nonwoven fabric by thermal compression fusing according to Embodiment 1.
Figure 3B:
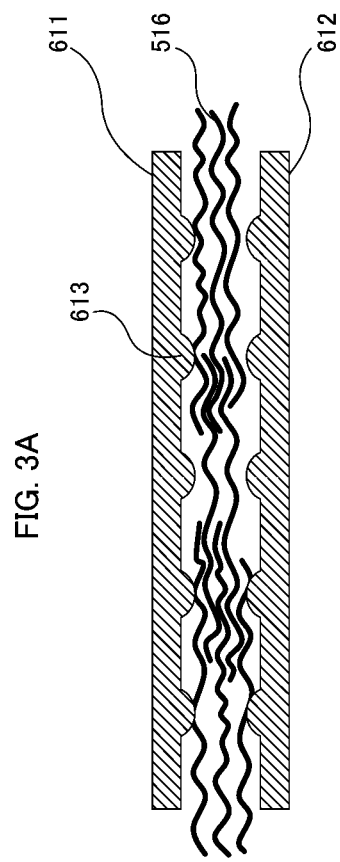
Figure 3C:
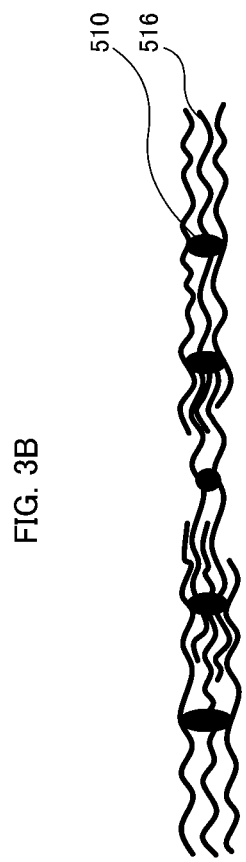

FIGS. 3A to 3C are schematic diagrams illustrating a method for creating a fused part of nonwoven fabric by the thermal compression fusing according to Embodiment 1. First, compression jigs 611 and 612 having projections 613 are provided. Jigs 611 and 612 provided preferably include projections 613 at parts corresponding to gas flow paths 147 and 148 of separators. Subsequently, compression jigs 611 and 612 are provided above and below nonwoven fabric 516, such that nonwoven fabric 516 is interposed between compression jigs 611 and 612. Subsequently, heat is transferred to nonwoven fabric 516 substantially at the same time as a pressure is applied such that projections 613 contact nonwoven fabric 516. By the thermal compression fusing on a part of nonwoven fabric 516, nonwoven fabric 516 having fused part 510 is formed. Since nonwoven fabric 516 includes layers of nonwoven fiber stacked, by fusing nonwoven fabric 516 using the thermal compression fusing, nonwoven fibers contact each other in the thickness direction of electrolyte membrane 410, allowing secure fusing.

As compression jigs 611 and 612, aluminum jigs are preferably used. This is because aluminum does not contribute much to the degradation of the electrolyte membrane, even when aluminum is present in the electrolyte membrane. If a compression jig made of iron, copper, chromium or others is used, when a foreign metal material such as iron, copper, or chromium enters the electrolyte membrane, iron ion, copper ion, and others may cause a chemical reaction such as substitution of a functional group in the electrolyte membrane material. Accordingly, in order to prevent reduction in the electrical generating property due to degradation in electrolyte membrane 410, it is preferable not to use iron, copper, and chromium as a material for compression jigs 611 and 612.

As compression jigs 611 and 612, a resin such as polytetrafluoroethylene (PTFE) or glass may be used for reducing the possibility of contamination, although the heat transfer property will be reduced.

When performing thermal compression fusing nonwoven fabric 516, the temperature of compression jigs 611 and 612 is preferably set in a range from 120° C. to 170° C. When the set temperature is too high, nonwoven fabric 516 is depolymerized due to thermal degradation and has decreased tension strength, losing its function as a reinforcement layer in electrolyte membrane 410.

When performing thermal compression, a pressure applied to nonwoven fabric 516 and time for applying the pressure may be determined to be the most suitable pressure and time depending on the temperature for compression jigs 611 and 612, such that the resin material for nonwoven fabric 516 is melt by the heat and neighboring fibers may be fused.

In addition to the thermal fusing, the fusing may be performed by irradiating nonwoven fabric with a laser beam. Alternatively, the fusing may be performed by fusing nonwoven fabric using an organic solvent, or supplying a solution containing a material for the nonwoven fabric dissolved to the part to be fused. A large-scale apparatus such as a roller press is required for thermal compression. However, the methods using irradiation of a laser beam and an organic solvent do not require such a large-scale apparatus.

The fused region of nonwoven fabric 516 is preferably in a range from at least 0.5% to at most 10% of a total area corresponding to power generating region 422 in nonwoven fabric 516. If the area of the fused region is smaller than the lower limit value, it is difficult to maintain stability in the dimensions of the electrolyte membrane, and power generation efficiency is reduced if the area exceeds the upper limit value. It is preferable that fused parts are equally spaced, and it is more preferable that the distance between the fused parts is at least 10 mm and at most 20 mm. If the area of the fused region is smaller than the lower limit value, it is difficult to maintain stability in dimension of the electrolyte membrane, and power generation efficiency is reduced if the area exceeds the upper limit value. It is preferable that fused parts are formed in a grid pattern. When used as a fuel cell, the grid pattern stabilizes the dimension of the electrolyte membrane and is more likely to reduce stress exerted from outside.

(iii) Step for Forming Electrolyte Membrane

Figure 4A:
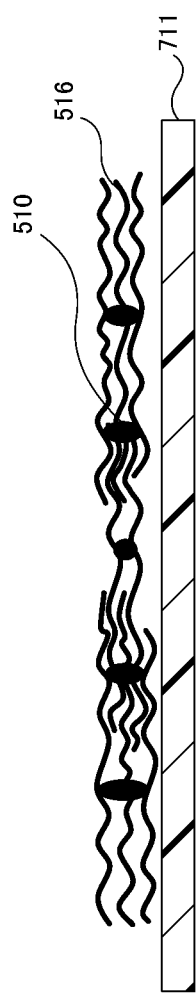
FIGS. 4A to 4C are schematic views of a process for applying an electrolyte material for an electrolyte membrane according to Embodiment 1.
Figure 4B:
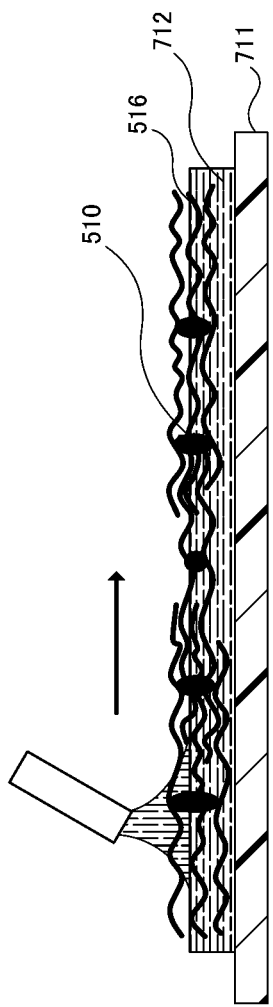
Figure 4C:
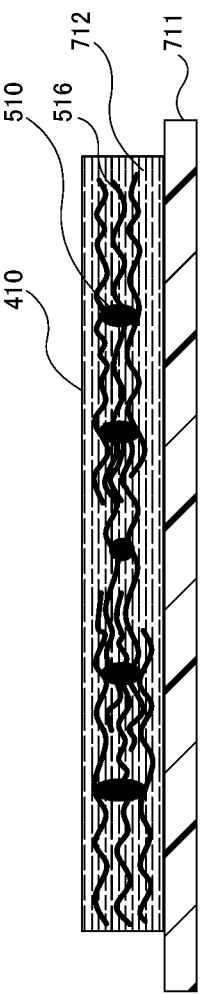

FIGS. 4A to 4C are schematic diagrams illustrating a method for manufacturing electrolyte membrane 410 according to Embodiment 1. First, as illustrated in FIG. 4A, polyethylene terephthalate sheet (PET base) 711 is prepared as a base. Nonwoven fabric 516 having fused part 510 is placed on PET base 711. Subsequently, nonwoven fabric 516 is impregnated with electrolyte solution 712, as illustrated in FIG. 4B. With the process described above, electrolyte membrane 410 as illustrated in FIG. 4C is manufactured.

As electrolyte solution 712, a mixed solvent of water and ethanol is preferable. In order to impregnate nonwoven fabric 516 made of PVDF having fused part 510 with electrolyte solution 712, it is preferable that the ratio of water in the solvent is lower than or equal to half. When the ratio of water in the solvent is greater than or equal to 50%, electrolyte solution 712 does not seep through due to hydrophobic property of PVDF, preventing proper application.

Alternatively, electrolyte solution 712 may be applied on nonwoven fabric 516 having fused part 510, using a bar coater (not illustrated). Alternatively, electrolyte solution 712 may be applied using a slit die, or by printing or spraying. It is preferable that a nonwoven fabric having a high rate of interstices per unit area is fully impregnated with the electrolyte solution.

After electrolyte solution 712 is applied, the solvent is vaporized so as to dry the solution. Note that, it is preferable that an electrolyte solution having the density adjusted is applied to form an electrolyte membrane having a predetermined thickness after drying.

After electrolyte solution 712 applied is dry, annealing is performed so as to crystallize the electrolyte. Crystallizing the electrolyte improves its durability. In this case, it is preferable that annealing is performed in an air atmosphere under the atmospheric pressure. It is even more preferable that the annealing is performed under a nitrogen atmosphere which is a gas inert to the electrolyte. Annealing in a reduced pressure state prevents bubbles and pin holes from appearing in electrolyte solution 712 applied.

It is preferable that the temperature for annealing is higher by 10° C. or more than the glass-liquid transition temperature of the electrolyte material. If the annealing temperature is too low, sufficient crystallization does not occur, making it unable to secure durability of electrolyte membrane 410. It is preferable that the annealing time is at least 30 minutes and at most 2 hours. If the annealing time is too short, sufficient crystallization does not occur. If the annealing time is too long, excessive crystallization occurs, reducing proton conductivity.

(Variation 1 of Manufacturing Method)

Figure 5A:
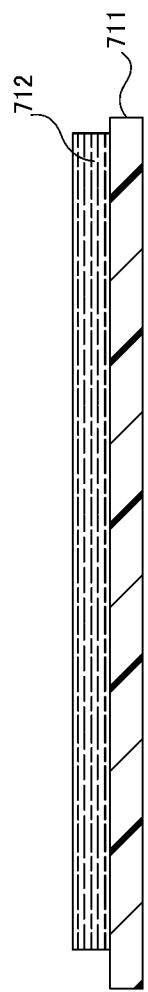
FIGS. 5A to 5C are other schematic views of a process for applying an electrolyte material for an electrolyte membrane according to Embodiment 1.
Figure 5B:
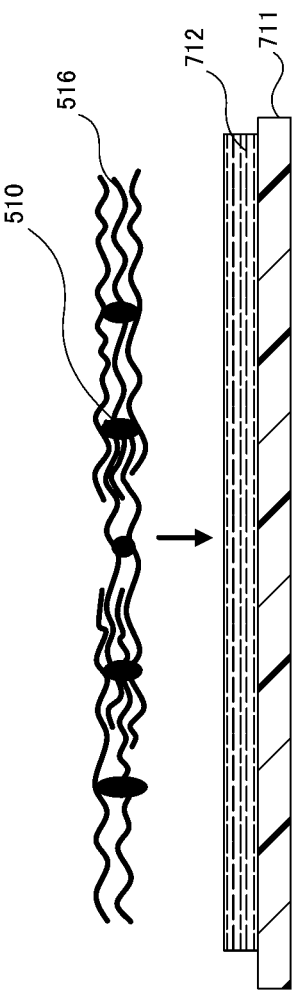
Figure 5C:
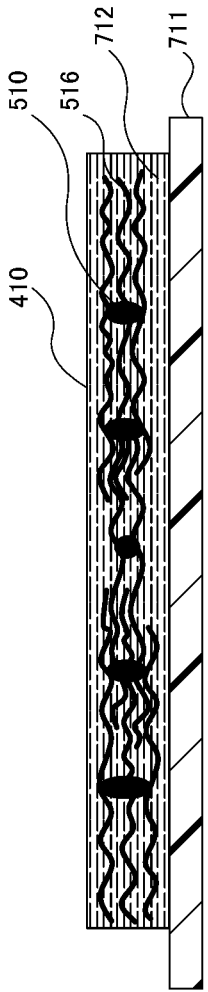

FIGS. 5A to 5C are schematic diagrams for applying an electrolyte material in an electrolyte membrane according to Variation of Embodiment 1. In Embodiment 1, electrolyte membrane 410 is obtained by applying electrolyte solution 712 to nonwoven fabric 516 on PET base 711 and drying electrolyte solution 712, as illustrated in FIGS. 4A to 4C. However, as illustrated in FIG. 5A, electrolyte solution 712 is applied on PET base 711 beforehand, and nonwoven fabric 516 having fused part 510 is provided before the solvent in electrolyte solution 712 dries, as illustrated in FIG. 5B, such that nonwoven fabric 516 sinks in electrolyte solution 712. When electrolyte membrane 410 is formed by sinking nonwoven fabric 516 having fused part 510 in the electrolyte solution applied, nonwoven fabric 516 having fused parts 510 is preferably fully soaked in electrolyte solution 712. With the process described above, electrolyte membrane 410 as illustrated in FIG. 5C is manufactured.

When nonwoven fabric 516 having fused parts 510 is exposed from electrolyte solution 712, irregularity is formed on the surface of electrolyte membrane 410 by nonwoven fabric 516 exposed from electrolyte membrane 410. If water generated when the fuel cell generates power accumulates in the irregularity, the water inhibits movement of electrons and gas, and there is a possibility that the electrical generating property is reduced. Accordingly, it is preferable that nonwoven fabric 516 is not exposed to electrolyte membrane 410.

(Variation 2 of Manufacturing Method)

Figure 6A:
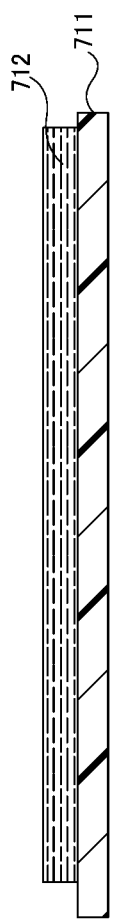
FIGS. 6A to 6D are other schematic views of a process for applying an electrolyte material for an electrolyte membrane according to Embodiment 1.
Figure 6B:
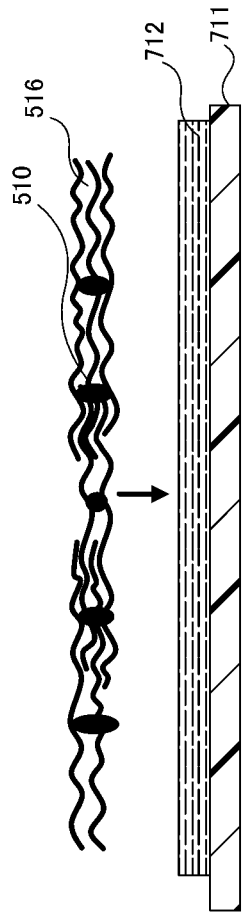
Figure 6C:
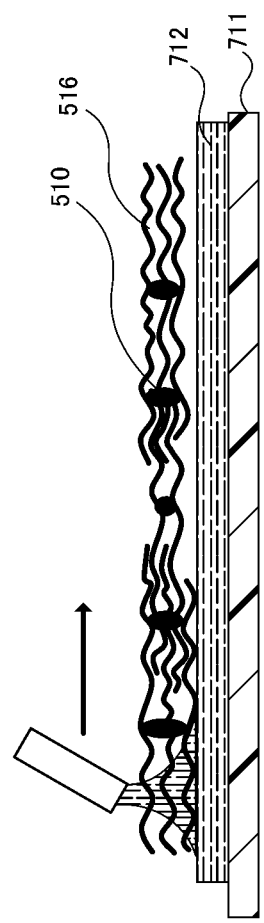
Figure 6D:
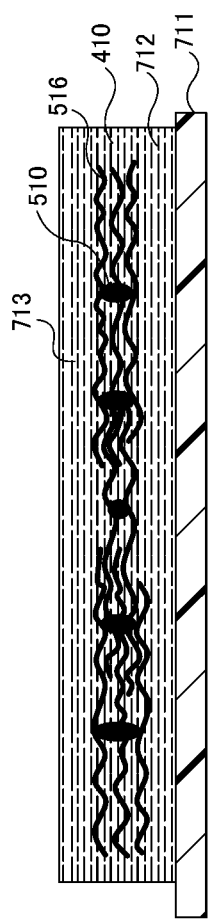

FIGS. 6A to 6D are schematic diagrams illustrating processes for applying an electrolyte material, in an electrolyte membrane according to Variation of Embodiment 1. First, electrolyte solution 712 is applied on PET base 711 in advance, as illustrated in FIG. 6A. Subsequently, after applied electrolyte solution 712 is dry as illustrated in FIG. 6B, nonwoven fabric 516 having fused parts 510 is placed on the electrolyte material (712). Subsequently, electrolyte solution 712 is applied on nonwoven fabric 516, forming electrolyte membrane 410, as illustrated in FIG. 6C. With this, as illustrated in FIG. 6D, layer 713 only composed of the electrolyte may be formed above and below nonwoven fabric 516. As a result, protons are likely to be transported from catalyst layers 127 and 128 formed above and below electrolyte membrane 410, improving electrical generating property.

Figure 7:
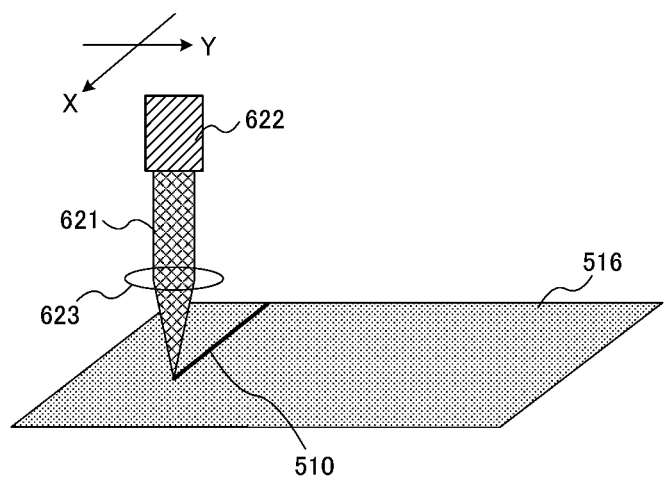
FIG. 7 is a schematic view of a method for creating a fused part of a nonwoven fabric by a laser beam.

FIG. 7 is a schematic diagram illustrating a method for fusing nonwoven fabric 516 using laser beam 621. A predetermined pattern of fused part 510 can be formed by collecting laser beam 621 oscillated by laser oscillator 622 on nonwoven fabric 516 using concentrating optics 623, and scanning nonwoven fabric 516 with laser beam 621 using driving scanning system (not illustrated). In FIG. 7, the pattern of fused part 510 is formed by scanning nonwoven fabric 516 with laser beam 621. However, the work (nonwoven fabric 516) may be moved, while laser beam 621 can be fixed. Accordingly, it is possible to maintain a positional accuracy of an optical device adjusted at high accuracy for a long time.

Alternatively, an optical system including a combination of mirror galvanometer (not illustrated) and fθ lens (not illustrated) may be used. With this configuration, it is possible to reduce the size of mechanism since it is not necessary to use a driving scanning system. Furthermore, productivity for forming fused part 510 can be improved. In addition, by splitting the laser beam through a diffraction grating (not illustrated) such as DOE and nonwoven fabric 516 is irradiated with split laser beams at the same time, the pattern on fused part 510 is collectively formed, improving the productivity in forming fused part 510.

Laser beam 621 may be continuous wave laser beam 621 or pulsed wave laser beam 621. When patterning fused part 510 by sweeping laser beam 621 or moving the work (nonwoven fabric 516), continuous wave laser beam 621 is preferably used. When pulsed laser beam 621 is used, laser beam 621 is intermittently oscillated. Accordingly, when the scanning speed of laser beam 621 or moving speed of the work (nonwoven fabric 615) is sufficiently high, the fused part is formed discontinuously by pulsed laser beam 621 fusing only a region irradiated with pulsed laser beam 621.

Since nonwoven fabric 516 is fused by absorbing laser beam 621 for heating, laser beam 621 having a wavelength in an infrared range is preferable, and laser beam 621 having a wavelength in the near infrared range such as a semiconductor laser and a carbon dioxide laser is even more preferable.

Figure 8:
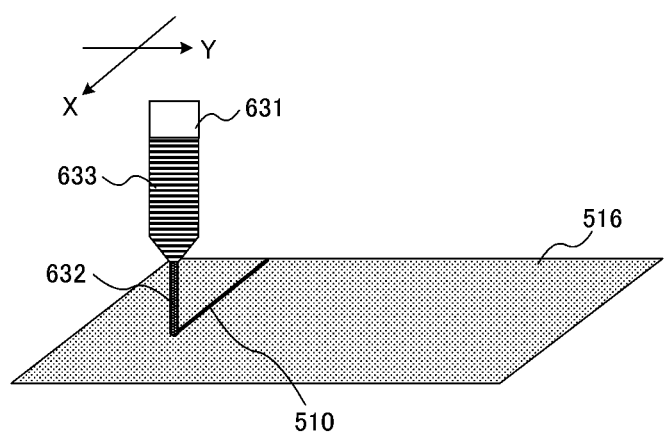
FIG. 8 is a schematic view of a method for creating a fused part of a nonwoven fabric by an organic solvent.

FIG. 8 is a schematic diagram illustrating a method for fusing nonwoven fabric 516 using organic solvent 633. Fused part 510 is formed by supplying organic solvent 633 to fused part 510 and melting nonwoven fabric 516 in a solvent. When supplying organic solvent 633 to fused part 510, a small amount of organic solvent 633 may be supplied by filling syringe 631 with organic solvent 633 and extruding organic solvent 633 from nozzle 632 attached to an end.

In Embodiment 1, an air-pulse dispenser (not illustrated) may be used for extruding organic solvent 633. For patterning fused part 510, the syringe or the nozzle may be moved, or the work (nonwoven fabric) may be moved.

For melting nonwoven fabric 516, organic solvent 633 used for producing a solution used for electrospinning may be used. Alternatively, another solvent capable of melting nonwoven fabric 516 may be used.

The present invention is not limited to Embodiment 1 described above, and other embodiments which are variations of Embodiment 1 may be possible. Embodiments 2 to 4 will be described as follows as variations of Embodiment 1, focusing on the differences from Embodiment 1.

(Embodiment 2)

Figure 9:
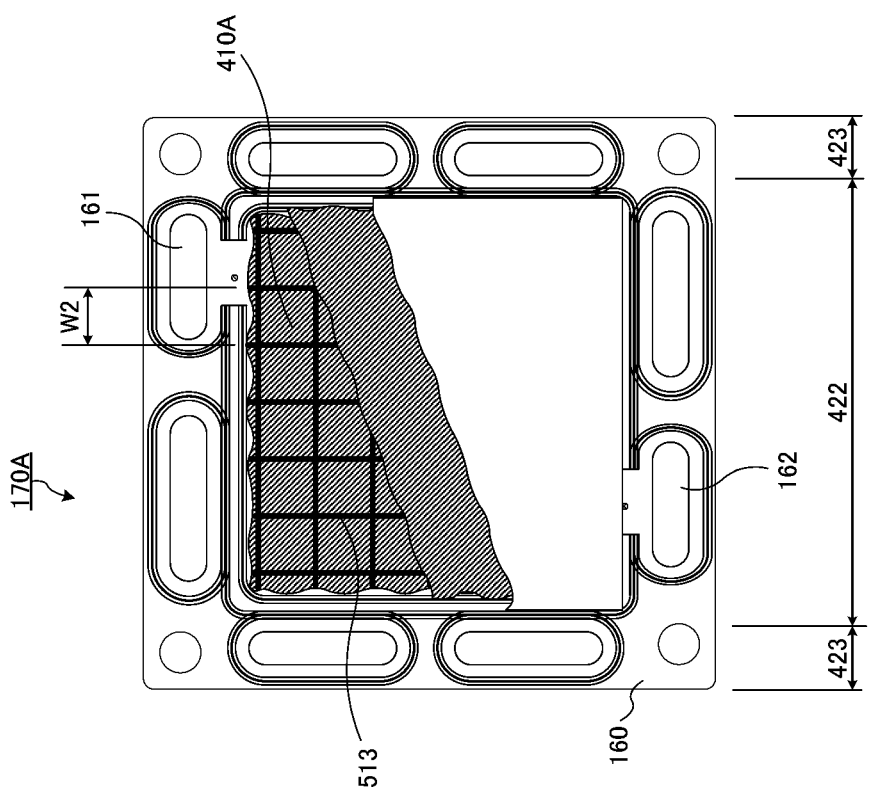
FIG. 9 is a partial cutaway top view of the cell module having fused parts in a grid pattern, composing a polymer electrolyte fuel cell according to Embodiment 2.

FIG. 9 is a partial cutaway top view of cell module 170A having fused parts in a grid pattern, composing a polymer electrolyte fuel cell according to Embodiment 2. As illustrated in FIG. 9, fused part 513 of nonwoven fabric included in electrolyte membrane 410A is arranged in a grid pattern in a region corresponding to power generating region 422 in Embodiment 2.

It is preferable that a line width of fused part 513 in a grid pattern is approximately 0.1 mm or wider for fusing adjacent fibers. Note that in Embodiment 2, the line width of fused part 513 is set as 1 mm.

It is preferable that distance W2 between grid-shaped fused parts 513 is in a range from 10 mm to 20 mm in consideration of the electrical generating property and preventing swelling in the thickness direction. More specifically, when the distance between fused parts 513 in a grid pattern is too large, the electrolyte material swells between the grid-shaped fused parts 513, changing the thickness.

In Embodiment 2, it is preferable that the thickness of electrolyte membrane 410A is set to be in a range from 20 to 30 μm, and that the distance between the grid-shaped fused parts 513 is set to be 20 mm. However, when electrolyte membrane 410A is thin, the change in the dimensions in the in-plane direction is smaller than the change in the dimensions in the thickness direction. Accordingly, the distance between fused parts 513 may be increased. A reduction in a total area of fused parts 513 with respect to a total area of the part corresponding to power generating region 422 allows better conduction of protons, which improves power generating efficiency of a fuel cell.

Alternatively, when a nonwoven fabric made of a nonwoven fiber having large tension strength is used, the distance between fused parts 513 may be increased. When the distance between fused parts 513 is large, the ratio of the total area of the fused parts 513 to the total area of the part corresponding to power generating region 422 becomes small. Accordingly, this is preferable since the influence on proton conduction is reduced.

The ratio of fused parts 513 to the total area of the part corresponding to power generating region 422 is preferably 0.5 to 10%, based on the line width and distance of fused parts 513 described above. Note that, the ratio of the part corresponding to power generating region 422 to the total area of fused parts 513 is approximately 5% in Embodiment 2.

(Embodiment 3)

Figure 10:
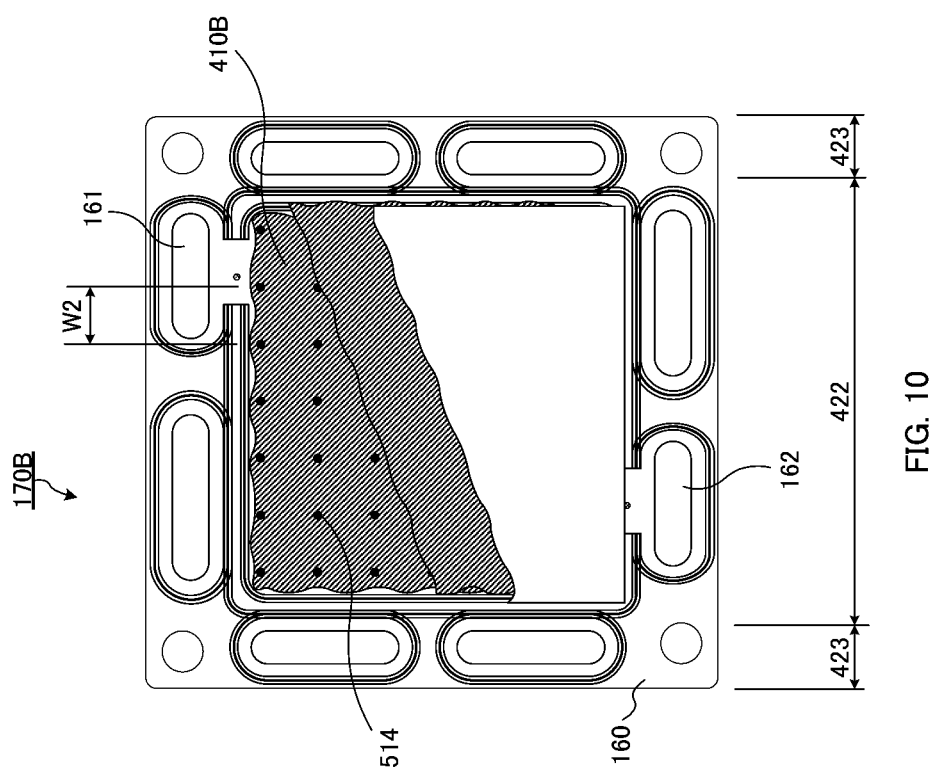
FIG. 10 is a partial cutaway top view of the cell module having dotted fused parts, composing a polymer electrolyte fuel cell according to Embodiment 3.

FIG. 10 is a partial cutaway top view of cell module 170B having dotted fused parts, composing a polymer electrolyte fuel cell according to Embodiment 3. As illustrated in FIG. 10, fused parts 514 of the nonwoven fabric included in electrolyte membrane 410B are arranged in dots within a region corresponding to power generating region 422.

It is preferable that the diameter of dotted fused parts 514 is approximately 0.1 mm or larger so as to fuse adjacent fibers. Note that in embodiment 3, the diameter of fused part 514 is set as 1 mm.

Distance W2 between dotted fused parts 514 is preferably in a range from 10 mm to 20 mm. The distance between dotted fused parts 514 here is set as 20 mm. When the distance between dotted fused parts 514 is too large, the electrolyte material swells between dotted fused parts 514, resulting in a change in the thickness.

In Embodiment 3, the thickness of electrolyte membrane 410B is preferably set as 20 to 30 nm, and the distance between dotted fused parts 514 is preferably set as 20 mm. However, when electrolyte membrane 410B is thin, the change in the dimension in the thickness direction is small. Accordingly, the distance between fused parts 514 may be increased. When the distance between fused parts 514 is large, the ratio of the total area of the fused parts 514 to the total area of the part corresponding to power generating region 422 becomes small. Accordingly, this is preferable since the influence on proton conduction is reduced.

(Embodiment 4)

Figure 11:
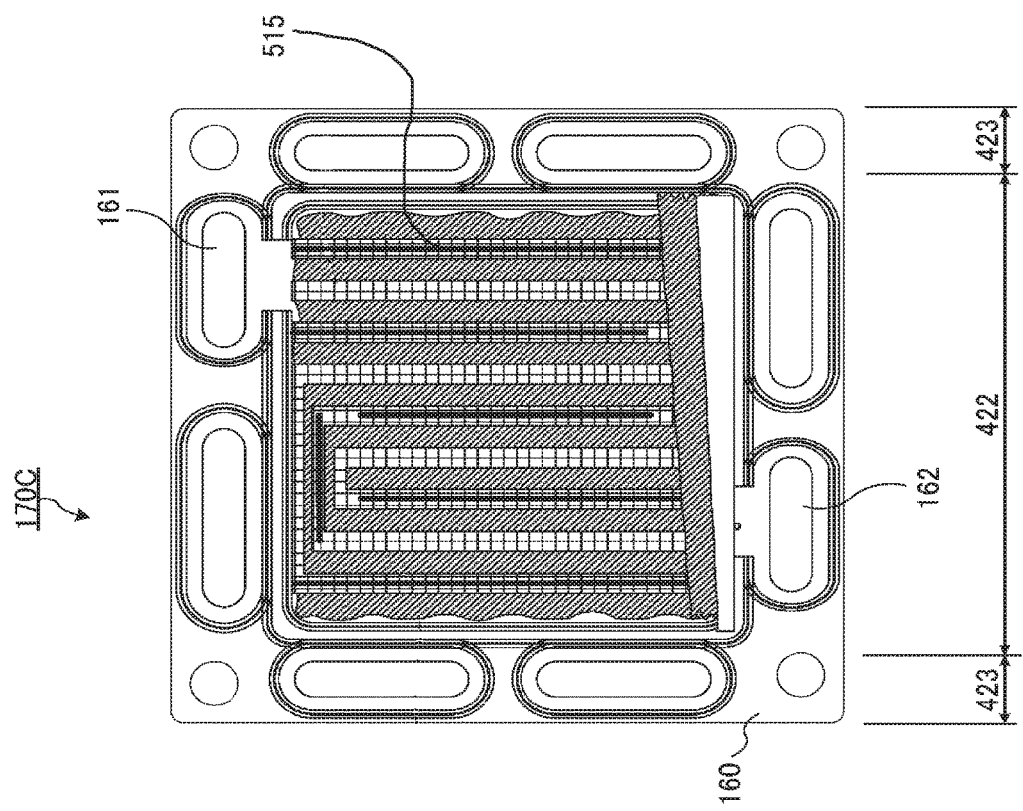
FIG. 11 is a partial cutaway top view of the cell module having a fused part along a flow path, composing a polymer electrolyte fuel cell according to Embodiment 4.
Figure 12:
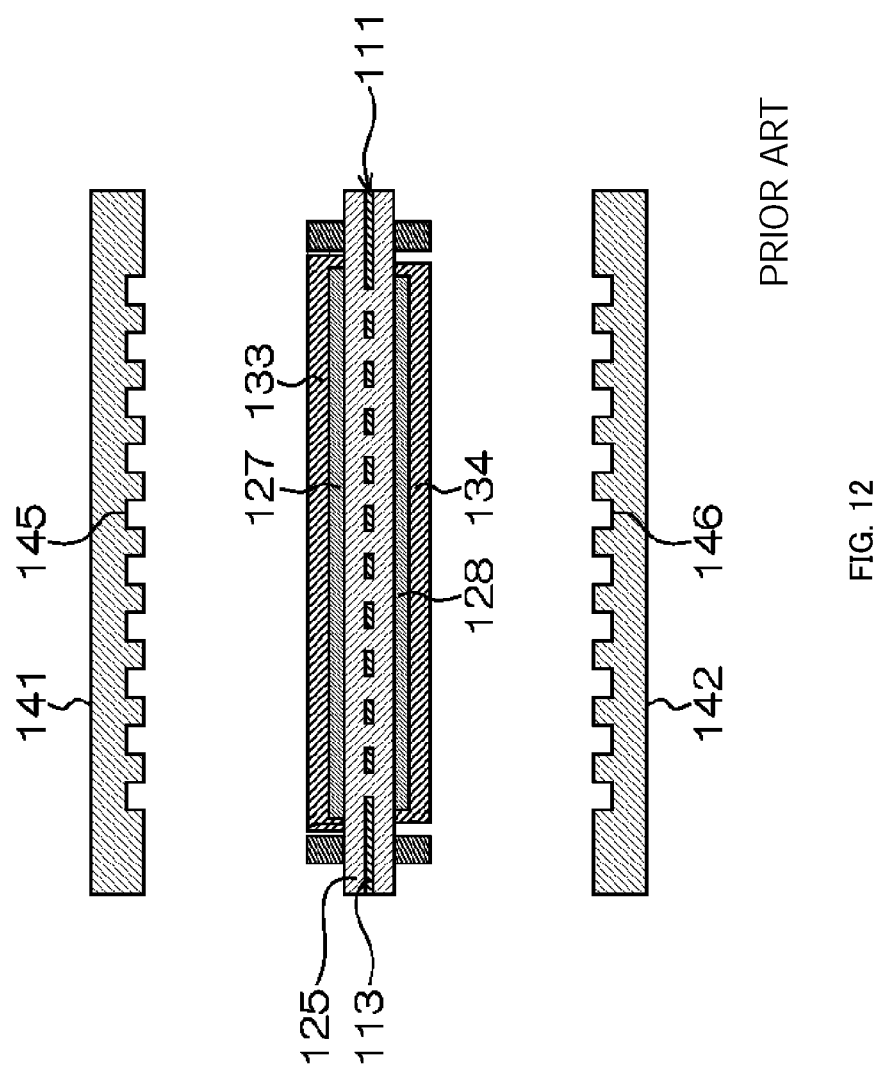
FIG. 12 is a cross-sectional schematic view of a membrane electrode assembly disclosed in PTL 1.
Figure 13:
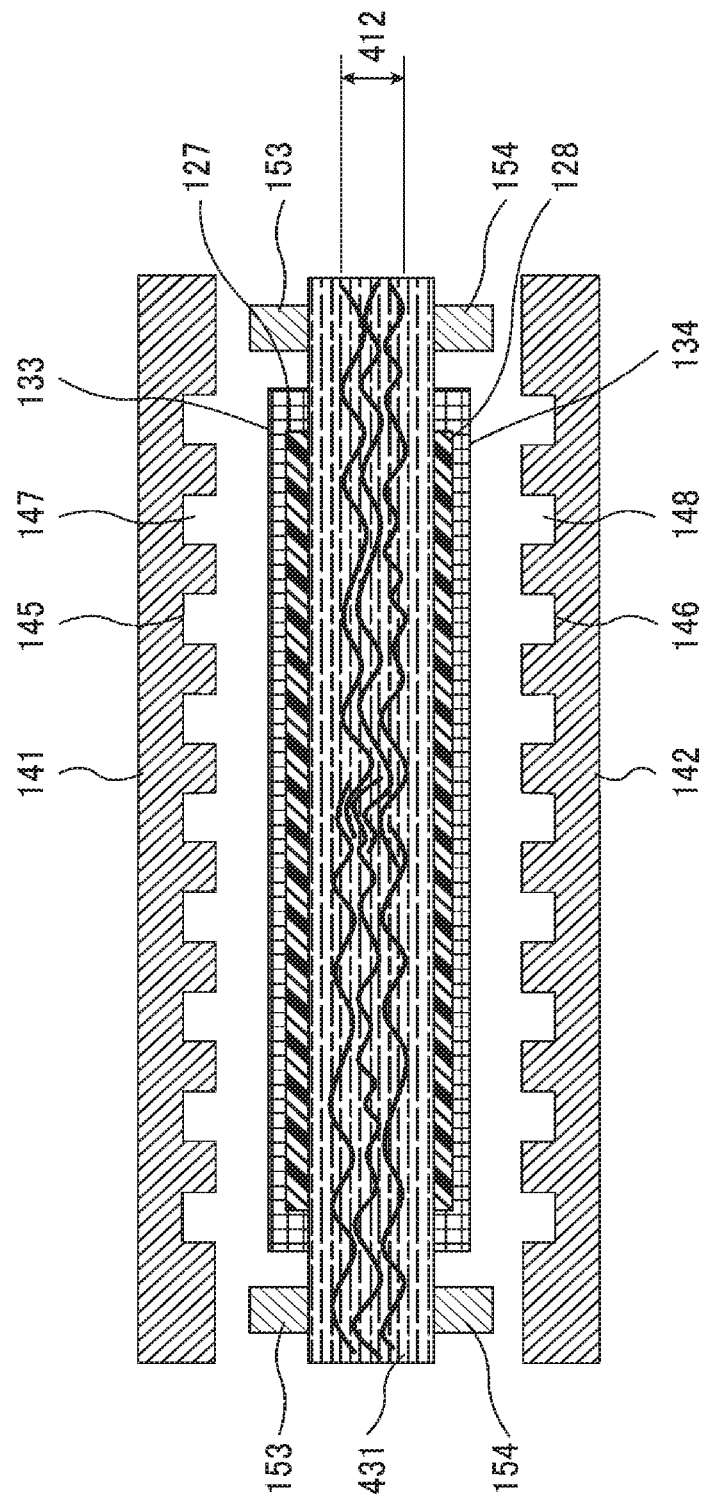
FIG. 13 is a cross-sectional view illustrating a conventional assembled cell module including a nonwoven fabric as a reinforcement layer in an electrolyte membrane.
Figure 14:
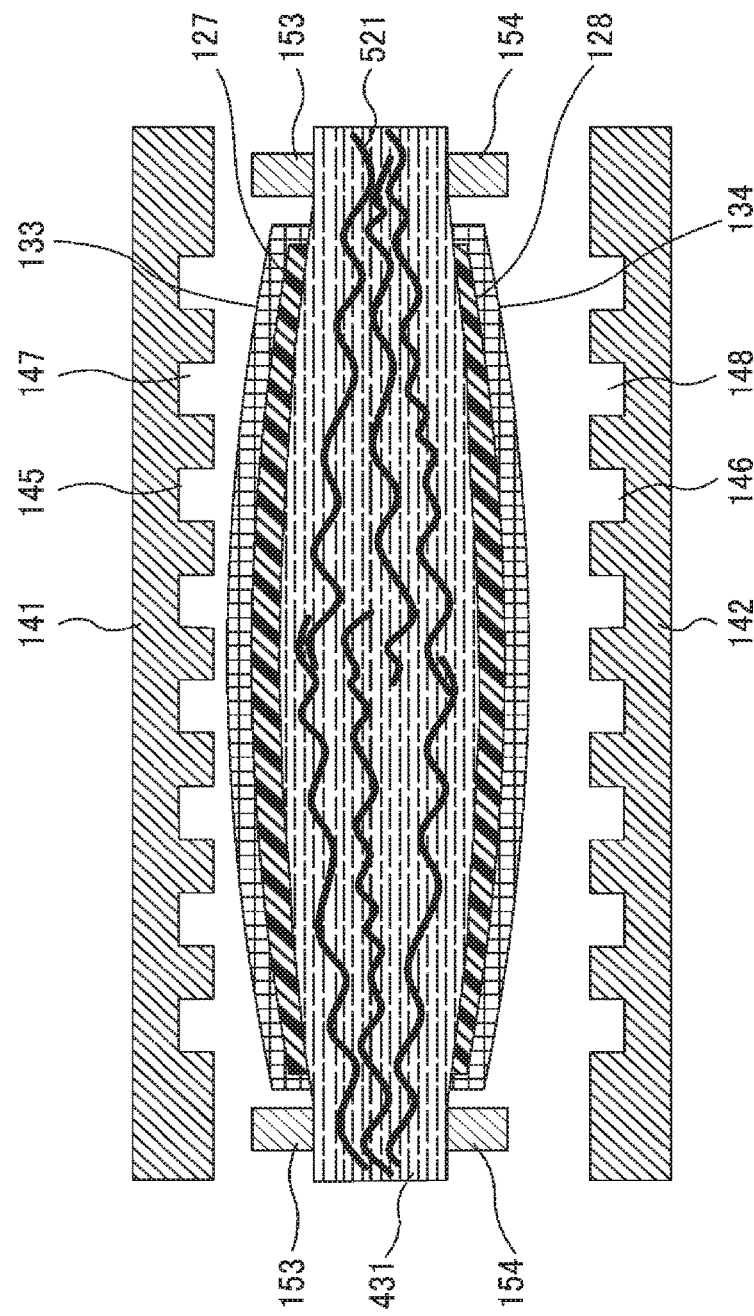
FIG. 14 is a cross-sectional view illustrating a cell module including a nonwoven fabric as a reinforcement layer in an electrolyte membrane in a swollen state.

FIG. 11 is a partial cutaway top view of cell module 170C having fused parts along flow paths composing a polymer electrolyte fuel cell according to Embodiment 4. As illustrated in FIG. 11, fused part 515 of nonwoven fabric included in Embodiment 4 is arranged along fuel gas flow paths 147 and 148 provided on separators 141 and 142 in FIG. 1, in a region corresponding to power generation region 422.

In Embodiment 4, fused parts 515 may be line-shaped or dotted as long as fused parts 515 are arranged along fuel gas flow paths 147 and 148. Here, the line width or the diameter of a dot of fused part 515 is set as approximately 1 mm. In Embodiment 4, since the widths of the fibers have a distribution ranging from approximately 0.1 to 100 μm, the line width or the diameter of the dot of fused part 515 along the flow path is preferably 0.1 mm or greater for fusing two or more adjacent fibers.

EXAMPLES

Example 1

[Production of Nonwoven Fabric (Nonwoven Fiber) Material]

PVDF was dissolved into DMAc by mixing 80 g of DMAc with 20 g of PVDF in pellets (manufactured by Arkema, molecular weight 275,000) and stirring the mixture by a rotation revolution mixer.

[Forming Nonwoven Fabric]

A nonwoven fiber manufacturing apparatus (manufactured by Panasonic Factory Solutions) to be used for electrospinning was provided. A 24G (inner diameter 0.31 mm, outer diameter 0.57 mm, and needle length 15 mm) nozzle made of stainless steel was attached to the end of a disposable syringe having a capacity of 10 mL.

A nonwoven fabric was manufactured under the following conditions: distance from a collector to the nozzle was set as 120 mm; the voltage applied between the collector and the nozzle was set as 20 kV; and the pressure for injecting the solution was set as 30 kPa. The diameters of fibers in the nonwoven fabric formed on the collector had a distribution from 400 nm to 1100 nm (i.e., the diameter of each fiber is in a range of 400 nm to 1100 nm), and the average diameter was 700 nm. The ratio of interstices per unit area of the nonwoven fabric was approximately 90%.

In order to improve productivity, 5 disposable syringes each having a capacity of 10 mL were provided. 5 nozzles were arranged in a straight line having intervals of 15 mm in between. The nozzles are scanned at a speed of 5 mm/s, and a nonwoven fabric having a uniform thickness was formed by scanning a plurality of times in a predetermined activation. A nonwoven fabric of 300 mm was manufactured. Mass per unit area was set as 1.28 mg/cm$^2$, and the thickness of the nonwoven fabric was set as 25 μm.

[Production of Fused Part]

Fusing jigs made of aluminum were used. One set of fusing jigs were provided for the upper surface and the lower surface. Each of the fusing jigs had a straight-line projection. The fusing jig was approximately 300 mm. A nonwoven fabric was clamped between the jigs for the upper surface and the lower surface, and heat and pressure were applied to the nonwoven fabric by using a heat press machine. A straight-line fused part was created in the nonwoven fabric by applying a pressure of approximately 1 MPa at 130° C. for 2 minutes.

[Method for Forming Electrolyte Membrane]

As an electrolyte solution, a perfluorocarbon sulfonic acid solution (Nafion®, manufactured by Du Pont, SE-20092) was used. The nonwoven fabric having fused parts are impregnated with the electrolyte solution, using a bar coater. The nonwoven fabric was impregnated with the electrolyte solution such that the thickness of the nonwoven fabric after drying and baking the impregnated nonwoven fabric would be 30 μm. Drying/baking was performed at 120° C. for one hour. PET base was removed after drying and baking so as to obtain an electrolyte membrane having a nonwoven fabric with fused parts as a reinforcement layer.

[Measurement of Dry/Wet Dimensional Change Rate]

An initial dimension of the electrolyte membrane was determined as follows: first, the electrolyte membrane was cut in a square having 30 mm on each side to create a sample; and the vertical length and the horizontal length of the sample were measured after leaving the sample in an atmosphere of temperature 25° C. and humidity 50% for 16 hours. Subsequently, the vertical length and the horizontal length of the sample were measured after the sample was soaked in deionized water at 80° C. The value was divided by the initial dimension, and the result was determined as the dry/wet dimensional change rate. Table 1 shows the results.

TABLE 1

|  | Example 1 | Comparative Example 1 | Comparative Example 2 |
|---|---|---|---|
| In-plane direction dimensional change rate | 102.14% | 118.30% | 102.57% |
| Thickness direction dimensional change rate | 122.21% | 141.80% | 167.76% |

Comparative Example 1

A nonwoven fabric as a reinforcement layer was not used, and a perfluorocarbon sulfonic acid solution (Nafion® manufactured by Du Pont, SE-20092) was used as an electrolyte solution. An appropriate amount of the electrolyte solution was applied on a PET base, using a bar coater such that the thickness of an electrolyte membrane obtained after drying and baking would be 30 µm. Drying/baking was performed at 120° C. for one hour. The PET base is removed after the drying and baking, forming an electrolyte membrane. Dry/wet dimensional change rate was measured in the same manner as Example 1. Table 1 shows the results.

Comparative Example 2

As an electrolyte solution, a perfluorocarbon sulfonic acid solution (Nafion®, manufactured by Du Pont SE-20092) was used. The nonwoven fabric was impregnated with the electrolyte solution using a bar coater. The nonwoven fabric was impregnated such that the thickness of the nonwoven fabric after drying and baking the impregnated nonwoven fabric would be 30 µm. Drying/baking was performed at 120° C. for one hour. A PET base was removed after the drying and baking, and the electrolyte membrane having a nonwoven fabric with fused parts as a reinforcement layer was obtained. A dry/wet dimensional change rate was measured in the same manner as Example 1. Table 1 shows the results.

The dimensional change rate in the planar direction in Comparative Example 2 was 102.57%, compared to 118.30% in Comparative Example 1. It is assumed that the nonwoven fabric provided on the entire surface as the reinforcement layer reduces the amount of dimensional change in the planar direction. In contrast, the dimensional change rate in the thickness direction was 167.76%, compared to 141.80%. Since the nonwoven fabric is piled in layers and provided in the electrolyte membrane in the thickness direction, it is assumed that the dimension in the thickness direction increased by swelling due to the electrolyte containing moisture.

The dimensional change rate in the planar direction in Example 1 is 102.14%, which is substantially same as 102.57% in Comparative Example 2. It is assumed that the dimensional change is substantially the same since the nonwoven fabric has the fused part provided on the entire surface. In contrast, the dimensional change rate in the thickness direction is 122.21% in Example 1, compared to 167.76% in Comparative Example 2. It is assumed that the dimension in the thickness direction is reduced by preventing expansion between the layers due to swelling of the electrolyte caused by moisture, using fused part provided on the nonwoven fabric layered.

The present application claims the priority of an earlier Japanese patent application filed by the same applicant, that is, Japanese Patent Application No. 2011-173510 filed on Aug. 9, 2011, the entire content of which is incorporated by reference herein.

INDUSTRIAL APPLICABILITY

According to the present invention, a nonwoven fabric used for reinforcing an electrolyte membrane can be effectively manufactured. Therefore, an electrolyte membrane which is thin has a high mechanical strength, high dimensional stability when containing moisture and low resistance can be manufactured. A membrane-electrode assembly obtained by using the electrolyte membrane produces a polymer electrolyte fuel cell having high electric characteristics and high durability, and is applicable to a household cogeneration system, an in-car fuel cell system, a power source for a base station used for mobile communication, and others.

REFERENCE SIGNS LIST 127, 128 Electrode layer
133, 134 Gas diffusion layer
141, 142 Separator
145, 146 Groove
147, 148 Gas flow path
153, 154 Gasket
160 Frame
161 Fuel gas inlet
162 Fuel gas outlet
170 Cell module (cell)
410 Electrolyte membrane
422 Power generating region
423 Membrane fixing part
510 Fused part
516 Nonwoven fabric

The invention claimed is:
1. A polymer electrolyte fuel cell comprising:
a plurality of stacked cell modules, each of the cell modules including:
an electrolyte membrane;
electrode layers each provided on a respective one of an upper surface and a lower surface of the electrolyte membrane; and
a pair of separators sandwiching the electrode layers therebetween, each of the separators having an inner surface with a gas flow path thereon;
wherein the electrolyte membrane includes:
an electrolyte material;
a nonwoven fabric included in the electrolyte material; and
fibers in the nonwoven fabric,
wherein the nonwoven fabric includes a plurality of fused parts provided in straight lines or dots, all of the fused parts being equally spaced apart, each of the fused parts being formed of two or more strands of nonwoven fiber fused to each other, the fused parts having a thickness smaller than a thickness of the nonwoven fabric, a diameter of each of the fibers being in a range of from 400 nm to 1100 nm, and all of the fused parts extending along the gas flow path of the separators so as to impede expansion of the electrolyte membrane into the gas flow path;

wherein a percentage of an area of the fused parts provided in the straight lines or dots is in a range of from at least 0.5% to no greater than 10% of a total area of a part corresponding to a power generating region of the nonwoven fabric; and wherein fused parts that are unequally spaced apart do not exist in the electrolyte membrane.

2. The polymer electrolyte fuel cell according to claim 1, wherein a distance between all adjacent fused parts of all of the fused parts in the nonwoven fabric is at least 10 mm and no greater than 20 mm.

3. The polymer electrolyte fuel cell according to claim 1, wherein all of the fused parts in the nonwoven fabric are formed in a grid pattern.

4. The polymer electrolyte fuel cell according to claim 1, wherein all fused parts present within the nonwoven fabric are arranged in the straight lines or dots and are equally spaced apart.

* * * * *